May 25, 1965     H. BOHM ETAL     3,185,809
TEMPERATURE SENSITIVE CONTROL

Filed Aug. 31, 1962     2 Sheets-Sheet 1

INVENTORS
HELMUT BOHM
HERBERT DURAS
BY
ATTORNEYS

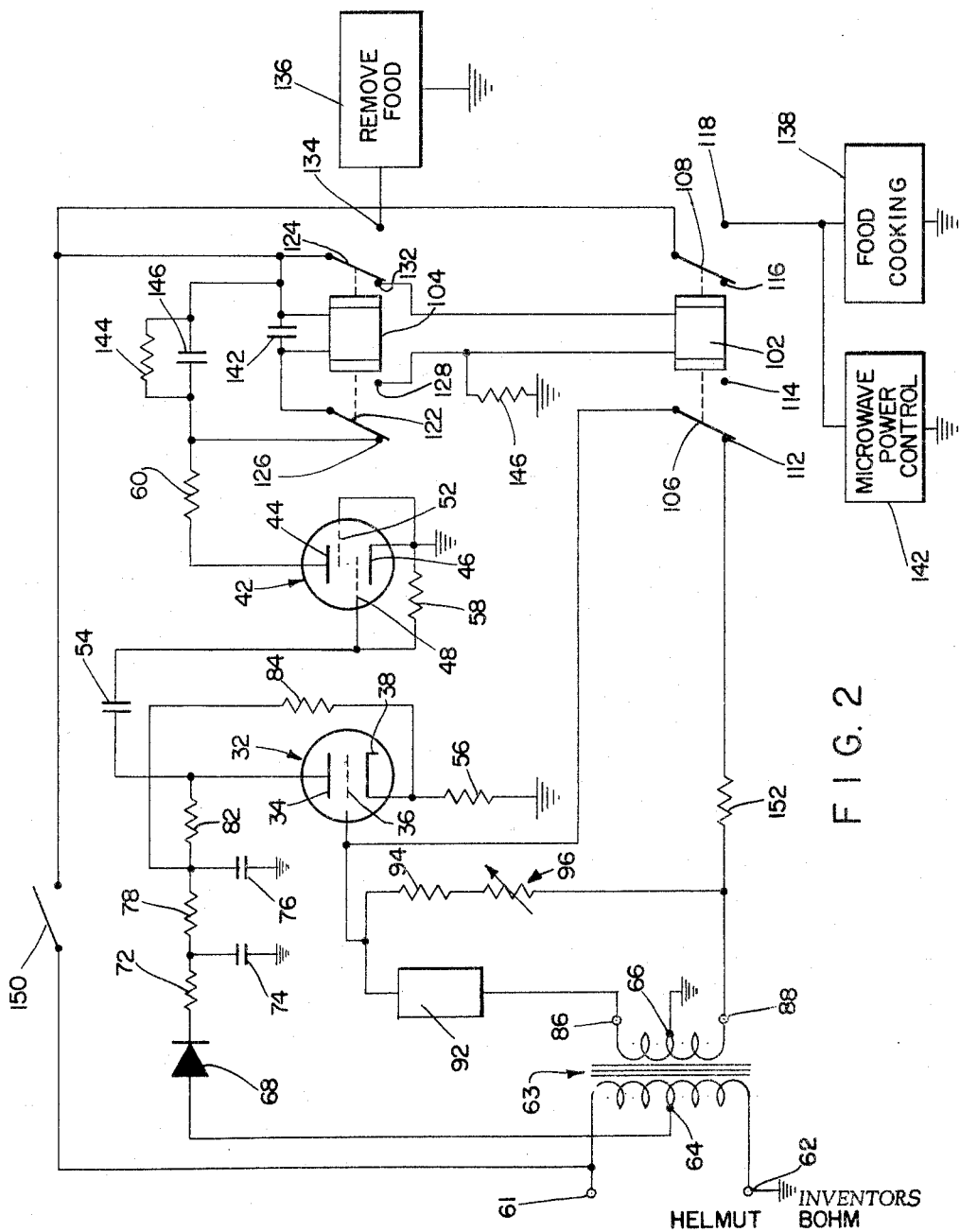

3,185,809
TEMPERATURE SENSITIVE CONTROL
Helmut Bohm, Rockford, Ill., and Herbert Duras, Oberderdingen, Germany, assignors to Miwag Mikrowellen Aktien Gesellschaft, a corporation of Switzerland
Filed Aug. 31, 1962, Ser. No. 220,808
Claims priority, application Germany, Sept. 4, 1961, D 36,960
4 Claims. (Cl. 219—10.55)

This invention relates in general to microwave ovens and more particularly to apparatus for controlling the amount of energy applied to foods and other substances exposed to microwave energy in the oven.

When heating an object, such as food, in a microwave oven, it is intended to heat the food until it is cooked to a desired state where the food is "done." Because of the rapid heating occurring in microwave ovens, overheating of foods by one or two seconds can cause an inferior product by drying the food excessively.

In conventional gas and electric ovens, a temperature sensing device that is placed directly in the food is actuated almost entirely by the heat conveyed to it by conduction from the food since the heating of the sensing device caused by radiation from the heating element of the oven is negligible. Many conventional gas and electric ovens have a temperature sensing device located in the oven in the vicinity where food is placed for heating. The sensing device is heated by convection from the air in the oven and may also be heated by conduction from the metal walls of the oven. The slow heating taking place in a conventional gas or electric oven causes the air in the oven to be heated to nearly the same temperature as the food and, therefore, a sensing device which responds to the temperature of the air in the oven is, in most cases, an adequate approximation of the temperature of the food being cooked.

In a microwave oven, heating is due to absorption of the microwave energy impinging upon the food in the oven. The amount of energy absorbed depends upon the characteristics of the material upon which that energy is incident and varies widely for different materials. For example, a temperature sensing device may absorb more energy than a food, if both are directly exposed to the same radiation. Heating by microwave energy is accomplished in a relatively short time, and, therefore, conduction cannot be relied upon to equalize the temperature between a temperature sensing element and the food in which it is placed.

The air in a microwave oven is not directly heated to any appreciable extent by absorption of energy from the radiation in the oven. Because the heating of food in a microwave oven is very fast, air convection cannot be relied upon to transfer heat from the food to a temperature sensing device located nearby even if that sensing device could be prevented from absorbing energy directly from the radiation in the oven.

One of the prior techniques seeking to obtain correct heating in microwave ovens employs controls for setting the desired level of microwave power and the length of time that power is applied. For an inexperienced user of microwave heating, the knowledge for setting the controls is acquired, generally, after a long period of trial and error. Moreover, should the characteristics of the source of energy change, as by deterioration of the magnetron tube, or the characteristics of a food change, as from one crop to another, the knowledge, gained by experience, as to the proper settings of power and time would have to be discarded. Another technique previously used has been to determine the amount of power required to cook a food from a determination of certain of the food's characteristics, such as its weight and its electrical impedance. However, the principal disadvantage of such a system is that food characteristics vary so widely even for the same variety of food.

Another problem inherent in the use of microwave ovens is the fact that as food changes state, i.e., from frozen to liquid, a change in electrical impedance of the food occurs. Thus, when a microwave oven is turned on, a frozen object presents a very low impedance to the source of energy, and as the food absorbs microwave energy and thaws, its impedance increases. Should a large amount of power be introduced into a microwave oven while the object presents a low impedance, the reflection of energy back to the source, due to the mismatch of impedances, could cause damage to the microwave generator; that is, could damage the magnetron tube generating the microwave energy.

The principal object of the present invention is to provide apparatus for automatically determining when food, or other substances, in the microwave oven has been heated to a desired temperature and then causing the microwave power to the oven to either be shut off or reduced to a level where the food is kept warm. An inherent advantage of the present invention is that a minimum of knowledge or skill in the cooking of foods is required by the operator of the oven.

The invention is based upon the observation that heated foods give off vapors. All foods are constituted in part by water. Therefore, when a food is heated it gives off water vapor, and if heated to a high enough temperature steam results. Many foods, when heated, give off gases and other vapors in addition to water vapor. The temperature of the vapors and gases is a reliable indicator of the temperature reached by the food in the oven.

The invention resides in a microwave oven constructed to convey vapors and gases, given off by a heated object in the oven's enclosure, to a temperature sensing element located in an exhaust duct where the element is not exposed to microwave radiation. The temperature sensing element is employed to control the microwave power applied to the oven, as, for example, by shutting off the power when the food is "done" or cutting the power to a level sufficient only to keep the food warm.

Other objects and many of the attendant advantages of the invention will be readily appreciated as the invention becomes better understood from a perusal of the following detailed description when considered in connection with the accompanying drawings, wherein:

FIG. 2 depicts a typical circuit arrangement of the sensor circuit.

Figure 1:
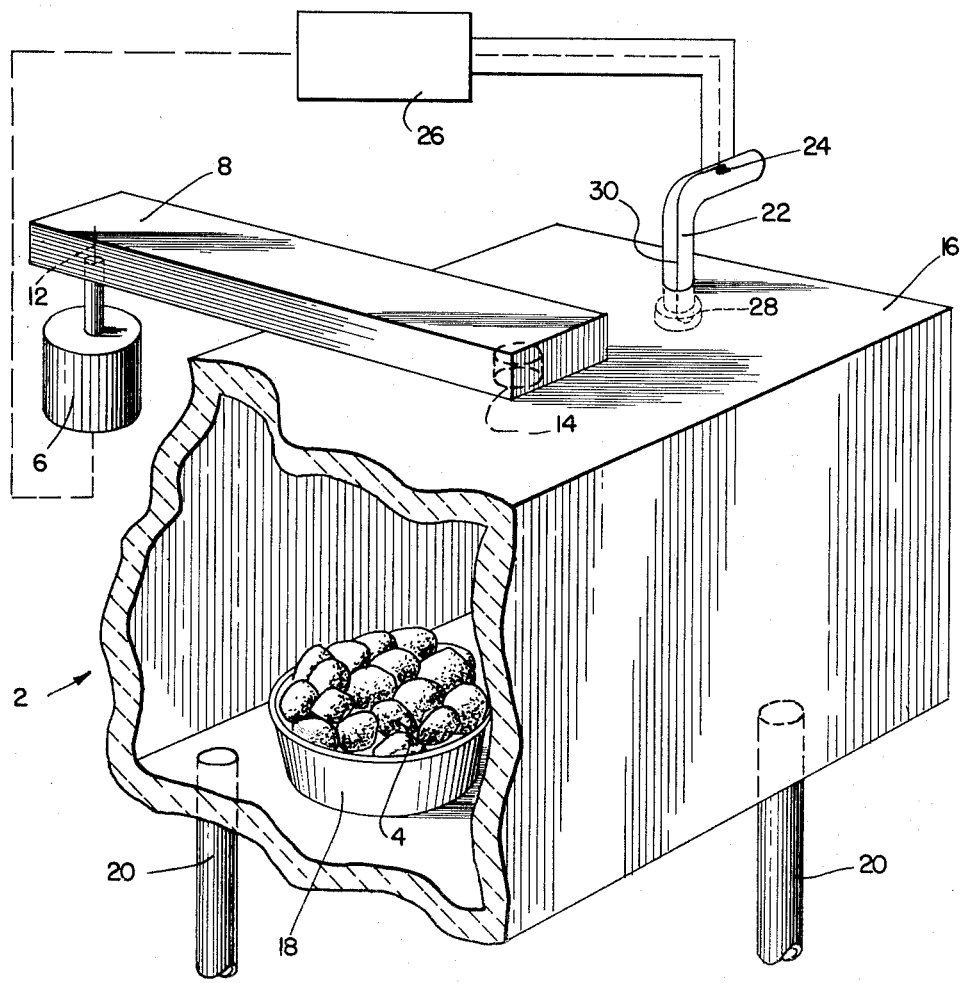
FIG. 1 depicts a microwave oven in accordance with the invention.

Referring now to FIG. 1, there is shown an enclosure 2 of a microwave oven into which objects 4, such as foods, are placed. A microwave generator 6, here assumed to be a magnetron tube, feeds energy into a waveguide 8 by means of a radiating element 12. Energy in the waveguide 8 is transferred to the enclosure 2 through a coupling slot 14 which is common to both the waveguide 8 and the top wall 16.

The food 4 is placed on a platform 18 in the oven, the platform usually being of a dielectric material. The microwave energy fed into the oven is absorbed by the food 4 and causes the food to be heated. Vapors given off by the heated food pass by convection, suction, or pressure channeled by air vents 20 to an exhaust duct 22. A thermosensitive device 24 such as a thermistor or a bimetallic element responds to the heat of the vapors passing through the exhaust duct.

It has been found that the temperature of the vapors is directly proportional to the temperature of the food, so that when he food reaches a predetermined temperature the sensing device may be used to turn off the power to the oven. This is done by connecting the sensing device to a bridge or relay network 26 which directly controls the power source 6 as shown by the dotted line in the drawing.

Provision must be made to turn the microwave energy off when no food or other object is present in the oven. For this purpose, a resistor 28 having appreciable loss at no-load conditions is placed in the oven in the vicinity of the duct. The resistor 28 is connected to the thermosensitive device 24 by a heat conducting member such as a wire 30. When the resistor 28 starts to heat up, its heat is transferred to the thermosensitive device 24 thereby shutting off the oven and thus preventing damage to any of the equipment.

The thermosensitive element may also be used to program the heating of certain foods. For example, in heating frozen liquids such as soup, the outer portion, upon becoming liquid, heats quickly while the inner portion remains frozen. Thus, vapors from the heated liquid causes the power source to shut off prematurely. It has been found that if the microwave energy source provides low power to the oven until a first temperature is reached and then the power is raised to a higher power level until the final temperature is reached, the frozen food will completely thaw and be heated to the correct temperature. This manner of heating is desirable because the frozen liquid presents a very low impedance and if large amounts of power were initially introduced into the oven, reflections caused by mismatch of the impedance to the source could harm the source of microwave energy. Of course, variations in the mode of heating, such as continuously increasing the power to the oven, rather than changing the amount of microwave power in steps, are possible.

With the foregoing in mind, reference is now had to FIG. 2 which shows the preferred embodiment of the sensing circuit. The circuit includes a triode 32 having an anode 34, a grid 36 and a cathode 38 and a thyratron 42 having an anode 44, a cathode 46 and pair of grids 48 and 52. The anode of triode 32 is connected through a D.C. blocking capacitor 54 to the grid 48 of the thyratron and the cathode 38 of the triode is connected through a biasing resistor 56 to ground. A biasing resistor 58 connects the grid 48 of thyratron 42 to ground. The grid 52 of the thyratron is connected directly to ground. The anode 44 of the thyratron provides an output through a resistor 60.

A.C. input power to the circuit is applied to terminals 61, 62 of the primary winding of a transformer 63. The primary winding of the transformer is center tapped at 64. The secondary winding of the transformer is center tapped to ground at 66.

The D.C. power supply circuit for the triode 32 contains a selenium rectifier 68, the anode of which is connected to the center tap 64 of the transformer's primary winding. The cathode of rectifier 68 is connected to an R-C filter having a pair of capacitors 74, 76 connecting resistors 72, 78 to ground. The filtered power is applied to the anode 34 of the triode 32 through a current limiting resistor 82 and to the cathode 38 through a biasing resistor 84.

An A.C. bridge circuit is connected across the secondary terminals 86, 88 of the transformer 63. The bridge circuit comprises a thermistor 92, which detects the temperature of vapors in the exhaust duct. The thermistor 92 is connected between terminal 86 and the grid 36 of triode 32. A fixed resistor 94 and a variable resistor 96 are connected in series from the terminal 88 to the grid 36.

The circuit further comprises a pair of double armature relays 102, 104. The relay 102 contains a pair of armatures 106, 108. Armature 106 is normally connected to a contact 112 and disconnected from a contact 114 while armature 108 is normally connected to a contact 116 and is disconnected from a contact 118. The relay 104 contains a pair of armatures 122, 124. Armature 122 is normally connected to a contact 126 and is disconnected from a contact 128. The armature 124 is normally connected to contact 132 and disconnected from a contact 134.

A signal light 136 which notifies the operator of the oven that the food is done, is connected between terminal 134 and ground. Connected to the terminal 118 to ground is a warning light 138 which informs the operator that the food in the oven is cooking. Also connected between contact 118 and ground is a control switch 142 which turns the microwave power to the oven on and off.

An energizing circuit for the relay 104 comprises a capacitor 142 which is connected in parallel with the windings of the relay 104. The parallel combination of the capacitor 142 and the winding of relay 104 is connected on one side to the armature 122 and on the other side to the armature 124. The energizing circuit further comprises a parallel combination of a resistor 144 and a capacitor 146. The resistor-capacitor combination is connected on one side to the armature 124 and on the other side to the contact 126.

The contact 126 is connected to the resistor 60. Contact 128 is connected to ground through a current limiting resistor 148. Armatures 108 and 124 are connected to the terminal 61 through a safety switch 150. The winding of relay 102 is connected on one side to contact 132 and on the other side to the current limiting resistor 146.

The armature 106 is connected to the grid of triode 32. A resistor 152 is connected between terminal 88 and the contact 112.

With the foregoing in mind, operation of the device of FIG. 2 for heating food to a predetermined temperature is as follows:

The potentiometer 96 is set for a predetermined value which corresponds to the temperature the food will heat to as will be explained hereinafter. The food to be heated is placed in the microwave oven. Switch 150 is then closed energizing the relay 102. Energization of the relay 102 causes armature 108 to close upon contact 118, turning the microwave power control 142 on and simultaneously illuminating the "food cooking" signal 138.

Energization of relay 102 also causes the armature 106 to disconnect resistor 152 from the grid of triode 32. Resistor 152, which effective shunts the bridge circuit formed by the thermistor 92, resistor 94 and variable resistor 96, is now cut out of the grid circuit of the triode 32. Therefore, only the bridge circuit remains in the grid circuit.

As the food in the oven heats up, the vapors given off, which consist mainly of steam given off by the food, causes the resistance of the thermistor 92 to decrease thus unbalancing the bridge. As the resistance of the thermistor decreases to the value corresponding to the predetermined temperature, the voltage at the grid 36 approaches the voltage at terminal 86 and on positive going half cycles causes the triode to amplify the signal on grid 36. The output of the triode, taken from anode 34, is fed through D.C. blocking capacitor 54 to the grid 48 of thyratron 42. The purpose of the triode 32 is to insure that the thyratron will fire cleanly without being subjected to transients or radiated interference.

Since the anode of thyratron 42 is connected through switch 150 to terminal 61 of the transformer's primary, the thyratron can fire only during one half cycle of the transformer's input signal. If, during that half cycle the potential applied to the thyratron's control grid becomes sufficiently positive, the thyratron will "fire" and a current will flow in its anode 44. When the thermistor 92 becomes hot, it causes the positive going signal at the anode of triode 32 to be in the proper phase to fire thyratron 42. The output signal from the thyratron's anode is fed through a resistor 60 which is used to suppress any transients in the output circuit. The output of the thyratron charges the capacitors 142 and 146. When the voltage across the capacitor 146 reaches a sufficient value, relay 104 is energized. Energization of relay 104 causes the armature 122 to move from contact 126 to contact 128. As the armature leaves the contact 126, the capacitor 146 is no longer across the relay 104 and the capacitor 142 commences to discharge through resistor 144. However, the capacitor 142 is still across the winding 104 and contains a sufficient charge to cause the armature 122 to complete the movement to contact 128. When the armature 122 connects to contact 128 the relay 104 remains energized through a path comprising positive terminal 61, switch 150, the winding of the relay 104, armature 122, contact 128, and resistor 146 to ground.

Energization of the relay 104 also causes the armature 124 to disconnect from contact 132 and connect with contact 134. Disconnecting the contact 132 from the armature 124 causes the relay 102 to become de-energized, thereby turning off the microwave power control 142 and the "food cooking" signal 138. Simultaneously, the connecting of the armature 124 to the contact 134 causes the "remove food" signal 136 to become energized, thus notifying the operator that the food in the oven has reached the desired temperature. Thereafter, opening of switch 150 causes the relay 104 to become de-energized and the oven ready for a new cycle.

It is advantageous to have the safety switch 150 connected to the door of the oven, so that should the door of the oven be opened when the microwave power is on, it will be immediately shut off and no microwave energy will be radiated out of the door of the oven.

Having described the invention, various modifications and departures will now occur to those skilled in the art, and the invention described herein should be construed as limited only by the spirit and scope of the attached claims.

What is claimed is:
1. In heating apparatus of the type employing an oven enclosure for confining microwave energy, a source of microwave energy, and means for coupling energy from the source into the enclosure, the improvement comprising:
 an exhaust duct venting the oven enclosure;
 means for causing vapors and gases in the oven enclosure to pass into the exhaust duct;
 a temperature sensitive element disposed in the exhaust duct, the temperature sensitive element being located where it is not exposed to wave energy radiating from the oven enclosure; and
 means governed by the temperature sensitive element for controlling the application of microwave energy to the oven enclosure.

2. Apparatus in accordance with claim 1 wherein the last-named means comprises a relay circuit, the relay circuit being operative to turn the microwave power applied to the oven on and off.

3. Apparatus in accordance with claim 1 wherein the temperature sensitive element is a thermistor.

4. Apparatus in accordance with claim 1 wherein the means for causing vapors and gases in the oven's enclosure to pass into the exhaust duct are vents permitting air to enter the enclosure and replace the air which passes out through the exhaust duct.

References Cited by the Examiner
UNITED STATES PATENTS

| | | | |
|---|---|---|---|
| 2,595,748 | 5/52 | Andrews | 219—10.55 |
| 2,929,905 | 3/60 | Hahn | 219—10.55 |

OTHER REFERENCES

German application 1,090,798, printed October 13, 1960.

RICHARD M. WOOD, *Primary Examiner.*